United States Patent [19]

Morris

[11] Patent Number: 5,717,616

[45] Date of Patent: Feb. 10, 1998

[54] COMPUTER HARDWARE INSTRUCTION AND METHOD FOR COMPUTING POPULATION COUNTS

[75] Inventor: Dale C. Morris, Menlo Park, Calif.

[73] Assignee: Hewlett-Packard Company, Palo Alto, Calif.

[21] Appl. No.: 19,720

[22] Filed: Feb. 19, 1993

[51] Int. Cl.[6] ............................................. G06F 17/00
[52] U.S. Cl. ........................... 364/715.09; 364/937.1; 364/937.2; 364/942.7; 364/754; 395/800; 395/888
[58] Field of Search ......................... 395/800, 899; 364/736, 737, 738, 739, 740, 741, 768, 784, 785, 786, 787, 788, 715.09, 937.1, DIG. 1, DIG. 2, 789, 937.2, 942.7, 754

[56] References Cited

U.S. PATENT DOCUMENTS

| | | | |
|---|---|---|---|
| 4,371,951 | 2/1983 | Kort et al. | 364/900 |
| 4,766,416 | 8/1988 | Noujaim | 340/347 |
| 4,989,168 | 1/1991 | Kuroda et al. | 364/715.09 |
| 5,321,823 | 6/1994 | Grundmann et al. | 395/425 |
| 5,455,873 | 10/1995 | Cameron | 382/270 |

Primary Examiner—Jack B. Harvey
Assistant Examiner—Valerie A. Darbe
Attorney, Agent, or Firm—Howard R. Boyle

[57] ABSTRACT

An apparatus and method for computing population counts of large bit strings. The present invention utilizes carry-save adders to reduce the time required to perform a population count on an operand in a register. Because carry-save adders do not propagate carries they are inherently faster than full adders utilized in the prior art. Additionally, the present invention implements a novel method for computing population counts whereby the operand bit string is split into smaller blocks and multiple partial population counts are performed. These smaller partial population counts require less time to compute than a full population count over the entire operand bit string.

8 Claims, 10 Drawing Sheets

COMPUTER HARDWARE INSTRUCTION AND METHOD FOR COMPUTING POPULATION COUNTS

FIELD OF THE INVENTION

The present invention relates to computers and particularly to a hardware instruction and method for a computer processor to compute a population count.

BACKGROUND

A population count refers to counting the number of "1"s in a string of bits. For example, the bit pattern "01011001" has a population count of 4. The population count of a string is useful for many types of algorithms and especially cryptographic analysis.

Some prior art computers implement special instructions to accelerate the computation of population counts. In general, these instructions take a single operand from a processor register, typically 32 bits in size, and compute the population count over the operand and returning the result to a register. When a population count for a binary string larger than fits into a register is needed, the population count is performed in pieces with the number of pieces dependant on the register size. The result from each piece is then summed using normal "add" instructions to produce the final population count result.

For speed and efficiency reasons, population count instructions are implemented to execute in a single CPU cycle. However, because the population count function is computationally complex, implementing a single-cycle population count instruction becomes problematic for very high-performance, high clock frequency CPUs. Compounding the speed problem is the current trend toward computers with wider data widths. The industry trend today is away from 32 bits and toward 64 bits. This means a population count instruction must now compute a population count across twice the number of bits as in the past and this takes more time to perform. The time delay of the population count function is approximately proportional to the log of the number of bits in the operand. So, a population count over 16 bits might take 4 time units, over 32 bits 5 time units and over 64 bits 6 time units.

FIG. 1 illustrates a prior art method of implementing a population count instruction in a computer having 64-bit registers. Register 101 contains the operand for which a population count is desired. The bits of the operand are split into bit pairs and each pair of bits is added by 1-bit full adders 103–109. While only four 1-bit adders are shown, 32 would be used to add the operand bits. The outputs of the 1-bit adders are divided into pairs and each pair of 2-bit results are added by 2-bit adders 111–117. Again, four 2-bit adders are illustrated but 16 would be used. In like manner, the outputs from the 2-bit adders are paired and added by eight 3-bit adders 119–133. Four 4-bit adders 135–141 are used to add together the eight 3-bit results and two 5-bit full adders 143 and 145 are used to add together the four 5-bit results. Finally, a 6-bit full adder 147 is used to add together the two 6-bit results to produce the final population count which is stored in the last 7 bits 149 of the result 151. Typically the result is stored in a register of the computer.

A problem with the prior art method of computing population counts is the time required for the entire "add" process to occur. In the example shown in FIG. 1, six levels of full adders were required to perform the population count. Because full adders are used, sufficient time must be allowed for the carry bits from each level of the adders to propagate to produce the final result. For example, in a 2-bit adder adding two binary bit streams "11" and "01", time must be permitted for the carry from the least significant bit addition to carry to the next least significant position and finally for the carry to occur into the most significant bit position to generate the correct answer "100". The subsequent 3-bit adders will not be able to generate a correct answer until the 2-bit results stabilize and sufficient time expires for the carries generated by the 3-bit adders to propagate. This process continues for each subsequent level and the cumulative delay to allow for all the possible "carries" is significant.

To permit a population count in a single CPU cycle, the carry delays must be minimized which requires the use of very fast logic circuits that consume a lot of power. Also, to minimize the delay times internal to the CPU, the population count circuitry must be located close to the core of the processor which restrains the flexibility of the CPU designer.

The prior art method of computing a population count over a large number of bits requires 3 CPU cycles for each block of bits (64 bits in the present example) in the operand string. One cycle is used for a memory load instruction, a second cycle is used to perform the population count instruction and the third cycle is an addition instruction to add the current population count to the previously computed population count sub-total. The three cycles per word represent the cost of computing population counts over large bit strings.

Therefore, what is needed in the industry is a new apparatus and method for computing population counts which can be implemented conveniently in CPU designs and permits the computation of population counts over a large number of bits faster than prior art methods.

SUMMARY OF THE INVENTION

The present invention provides a new and novel apparatus and method for computing a population count for a string of bits which requires less time and allows greater design flexibility than prior art designs.

Instead of implementing a population count instruction that computes the population count of a full register operand in one cycle, the present invention implements a population count instruction that divides the operand into multiple parts. In this way the CPU computes multiple smaller population counts and the multiple population counts are not reduced to a single number until the entire string has been processed. At the end of the string, the intermediate population count sums are reduced to the single count. The time required to produce the single count is amortized over the entire string and, for a large string of bits, is less than the total time for prior art methods.

Since smaller population counts take less time to perform than a full operand population count, higher CPU clock speeds are possible and more flexibility is afforded to the chip designers in CPU chip layout. In a first embodiment of the present invention, carry-save adders are utilized to combine the population count with a second summation operand. Because carry-save adders do not propagate the carries, they are much faster than the full adders used in the prior art designs and this approach provides a population count and a summation operation in one CPU cycle.

In a second embodiment, a population count is computed for an operand stored in two registers. Each half of the operand is divided into multiple parts with a population count computed for each part. The multiple population counts are not reduced to a single number until the entire string has been processed. Therefore the time required to produce the single count is amortized over the entire string and which requires less total time for a large string of bits.

DETAILED DESCRIPTION

Figure 2:
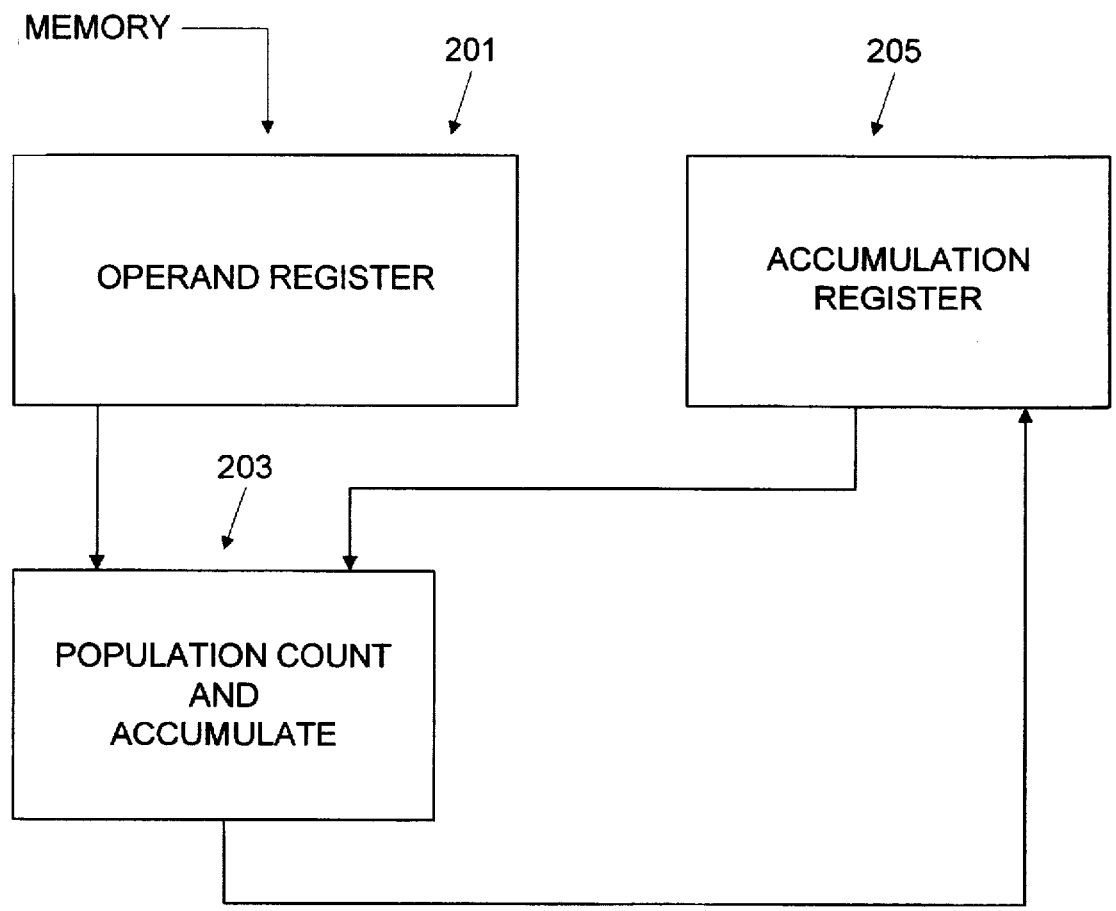
FIG. 2 is a block diagram of a population count instruction according to the present invention.

FIG. 2 is a block diagram of the present invention illustrating the data flow that occurs during a population count instruction. Typically, the string of bits for which a population count is desired is stored in memory in blocks of bits the size of which is determined by the data width of the computer. A block of bits is read from memory and stored in a CPU resister 201. A population count and accumulate logic block 203 computes the population count for the operand in resister 201 and adds to the count the value stored in an accumulation register 205. The result of the add is stored in the accumulation register 205 over-writing the previous value. The population count and the accumulation function occur within one CPU cycle. To perform the population count and accumulation functions within a single CPU cycle, carry-save adders are used. A carry-save adder adds two binary numbers but does not propagate the carries. Instead, the carries are stored as a separate part of the binary value. For example, if the two binary strings "11" and "01" were added by a full adder, the result would be "100" binary. If the same binary strings were added by a carry-save adder the result would be "01" (the carry part) and "10" (the sum part) or "0110" in carry save format. To convert from a carry-save format to a true binary format, the "01" is shifted left by one position and added to the "10". For example:

```
  "10"  Sum
+"010"  Carry
 "100"  result
```

Figure 1:
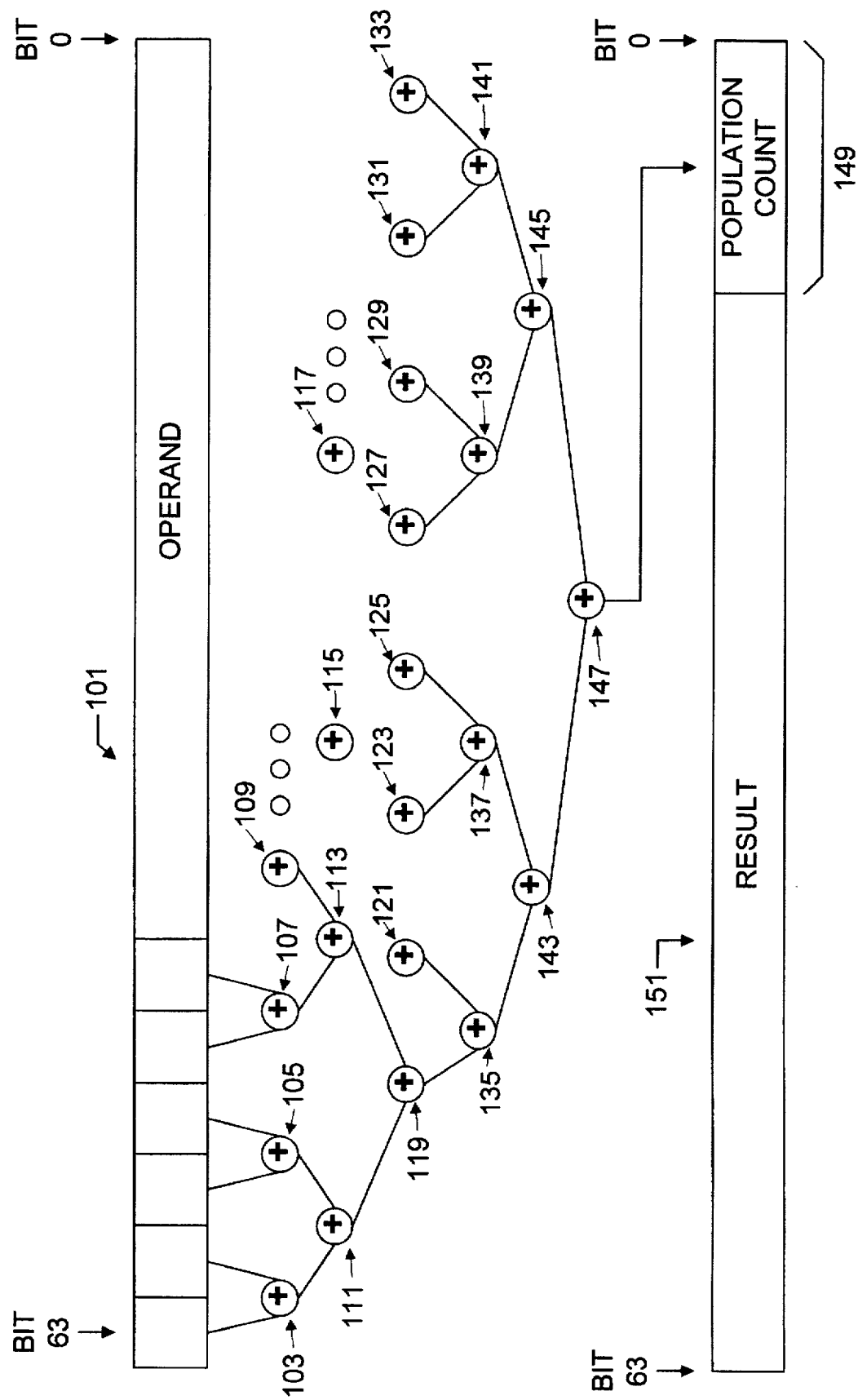
FIG. 1 illustrates a prior art method of computing a 64 bit population count.
Figure 3:
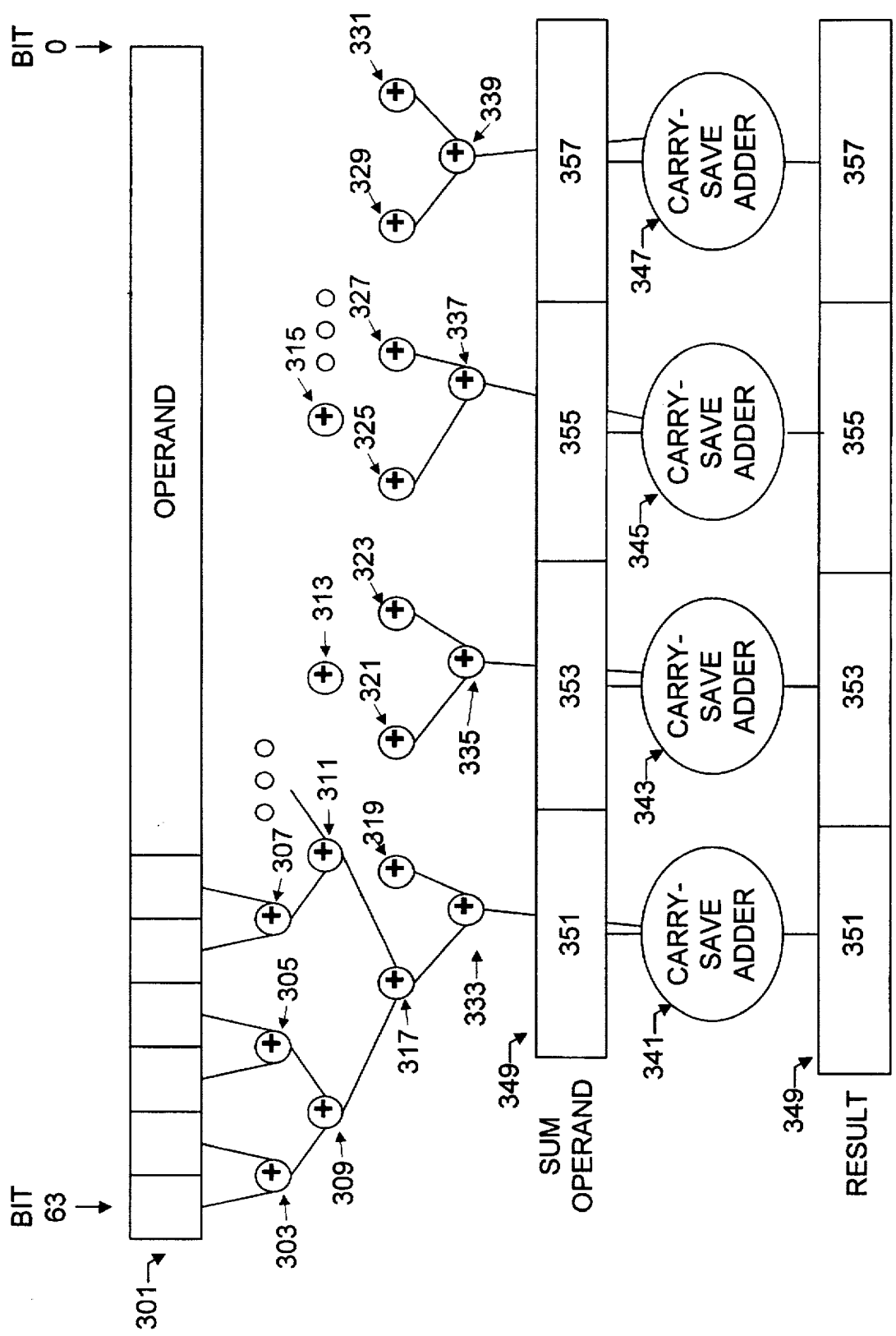
FIG. 3 illustrates a preferred embodiment of the present invention.

FIG. 3 illustrates a preferred embodiment of the present invention detailing an implementation of the population count instruction. The first four stages are similar in function and operation as the first four stages described in association with FIG. 1. A 64-bit operand is stored in a CPU resister 301. The bits in register 301 are paired and added by thirty-two 1-bit full adders represented by 303–307. Sixteen 2-bit adders, represented by 309–315, add together pairs of outputs from the 1-bit adders. Then eight 3-bit adders 317–331 add pairs of outputs from the 2-bit adders. Four 4-bit full adders 333–339 add pairs of outputs from the 3-bit adders. The output from the 4-bit adder 333 provides one of two inputs for a carry-save adder 341. In like manner, the outputs from the 4-bit adders 335–339 provide one of two inputs for carry-save adders 343–347. Each carry-save adder 341–347 adds 16 bits and since the 4-bit adders 333–339 can only generate a maximum output 5 bits long, the eleven most significant bits are fixed to be zero.

A second input to the carry-save adders 341–347 is provided by an accumulation register 349. The accumulation register is 64 bits wide and is treated as four 16-bit blocks 351–357 with the value in each block being stored in the carry-save format. As such, the most significant 8 bits in a block represent the carry information and the least significant 8 bits represent the sum information. The output of the carry-save adder 341, from the addition of the 5 bits from the adder 333 and the 16 bits from the accumulation register block 351, is stored in the accumulation register 349 in block 351 in carry-save format. This process provides for the automatic summation in the accumulation register block 351 of the previous partial population count from block 351 and the partial population count of the most significant 16 bits of the operand in register 301. The other carry-save adders 343–347 operate in like manner with the result being four updated partial population counts stored in the accumulation register 349 each time the population count instruction is performed.

In practice the accumulation register 349 would be cleared before the first population count instruction was performed. Each population count instruction thereafter would add to the accumulation register the four new partial population counts in carry-save format. The number of times the population count instruction can be performed before overflow of one or more of the partial counts can occur is dependant on the size of the accumulation register and the number of bits assigned to carries and sums. For a system which computes partial population counts over fields which are each $2^n$ bits in size, and where the carry-save format consists of "m" carry bits and "m" sum bits, the maximum number of iterations is given by:

$$i_{max} = 2^{(m-n)} + m - n - 1$$

So for example, in the preferred embodiment described above, population counts are calculated over 16-bit fields from register 301, so n=4 ($2^4$=16). The carry-save format described above is 8 carry bits and 8 sum bits so m=8. Therefore the number of times the population count instruction can be performed without the risk of overflow is:

$$i_{max} = 2^{(8-4)} + 8 - 4 - 1 = 19$$

After 19 iterations the four carry-save values in the accumulation register will have to be reduced further. While there are many ways to perform the required reduction, a preferred method is described below. However other methods may work equally well and a special CPU instruction could also be implemented to perform the reduction.

Figure 4:
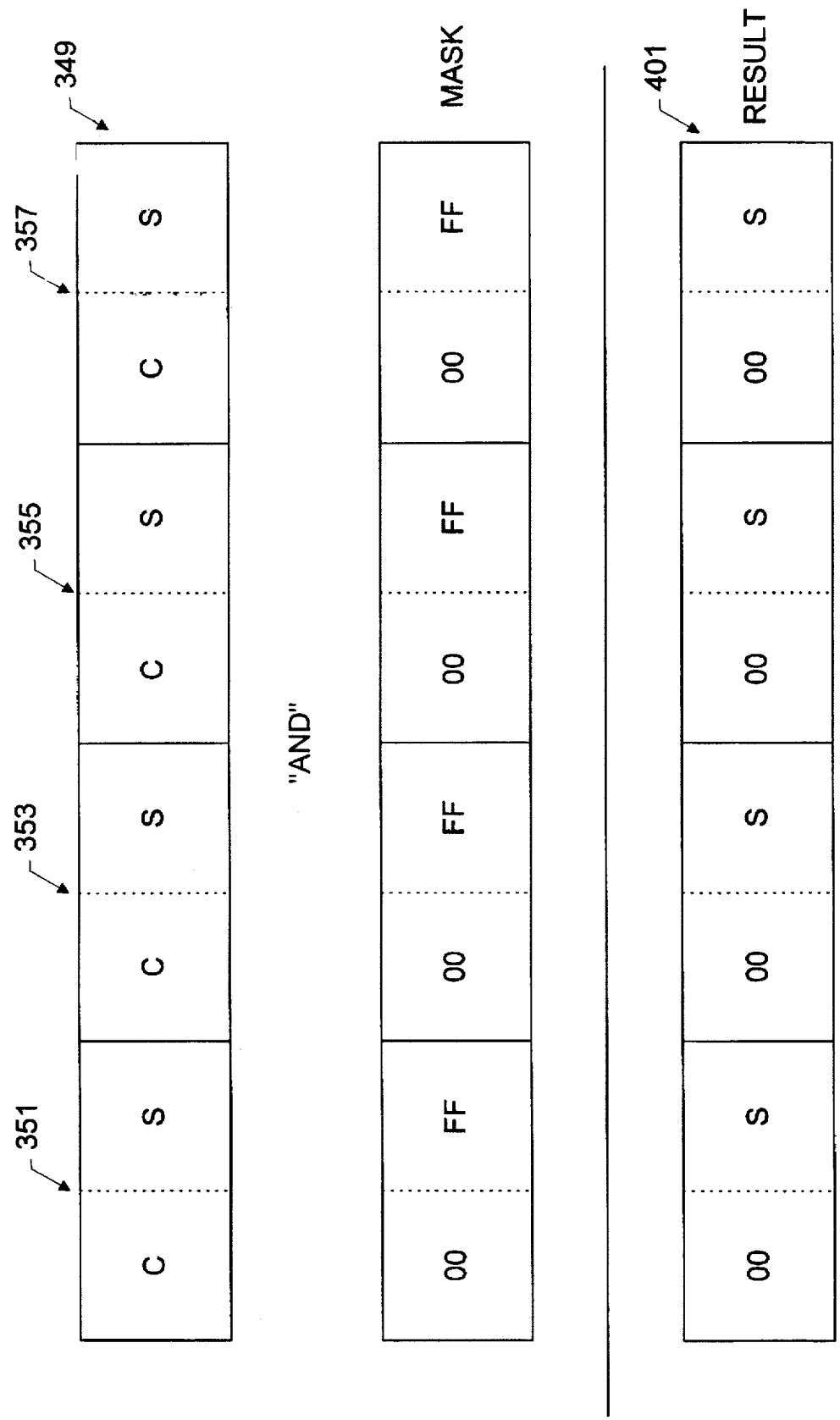
FIG. 4 illustrates step 1 of a partial population count reduction from a carry-save format into binary.

FIG. 4 illustrates step 1 in reducing the four partial population counts in the accumulation register to four binary values. To strip off the carries and leave the sums, the value in the accumulation register 349 is "anded" with a mask having all zeros ("00" Base 16) in the positions corresponding to the carry locations in the register 349 and "1"s ("FF" Base 16) in all other locations. As a result of the "and" instruction, the carry information is replaced by zeros in the result register 401 while the sum information is unaffected and mirrors the sum information in register 349.

Figure 5A:
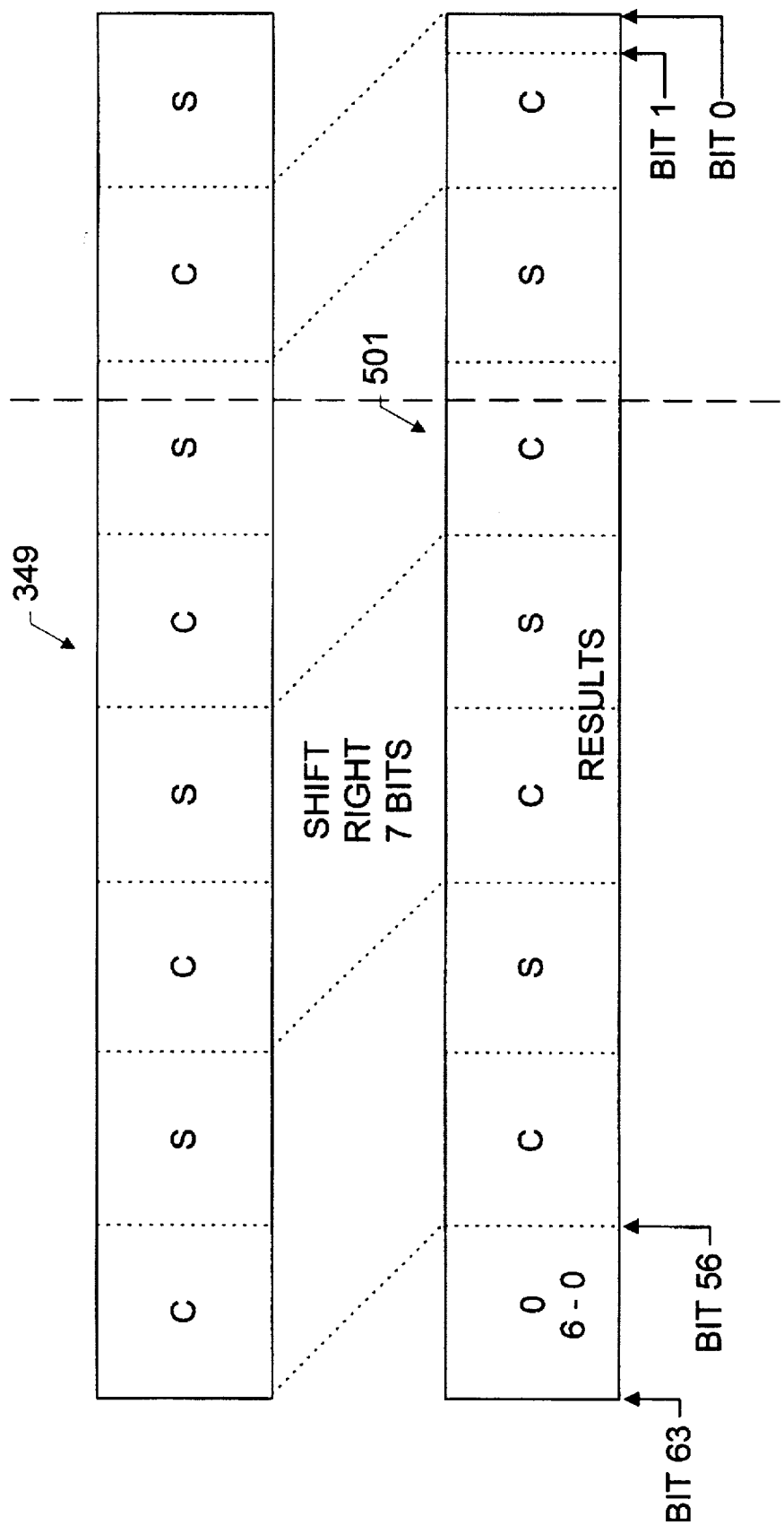
FIG. 5A illustrates step 2 of the reduction method.

FIG. 5A illustrates step 2 in the reduction process. Here the contents of the accumulation register 349 are stored in register 501 but shifted right by 7 bits. Therefore the most significant 7 bits (bits 56–63) of register 501 will be zeros and bit position 0 of register 501 will be equivalent to bit position 7 of register 349. This step serves to offset the carry information and align it with the sum information as required in subsequent steps.

Figure 5B:
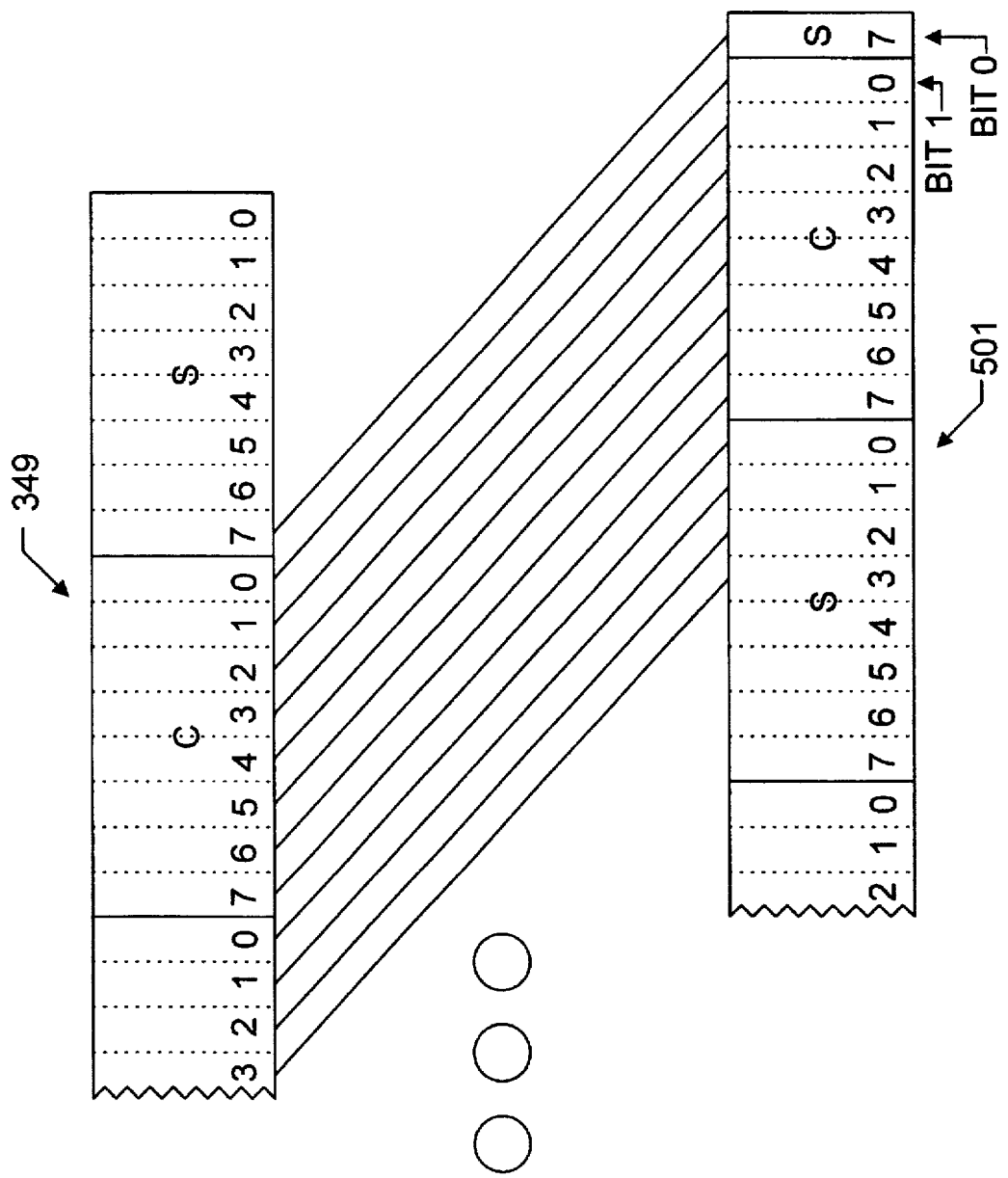
FIG. 5B is a detailed view of FIG. 5A taken along the 5B section line.

FIG. 5B is a detailed view of FIG. 5A taken along the section line 5B. The least significant 20 bits (bits 19–0) of the operand in register 349 is shown before it is shifted right by 7 bits. After the shift is performed, the register 501 holds the result with the least significant bits (bits 19–0) of register 501 now holding the data that was stored in register 349 bits 26–7.

Figure 6:
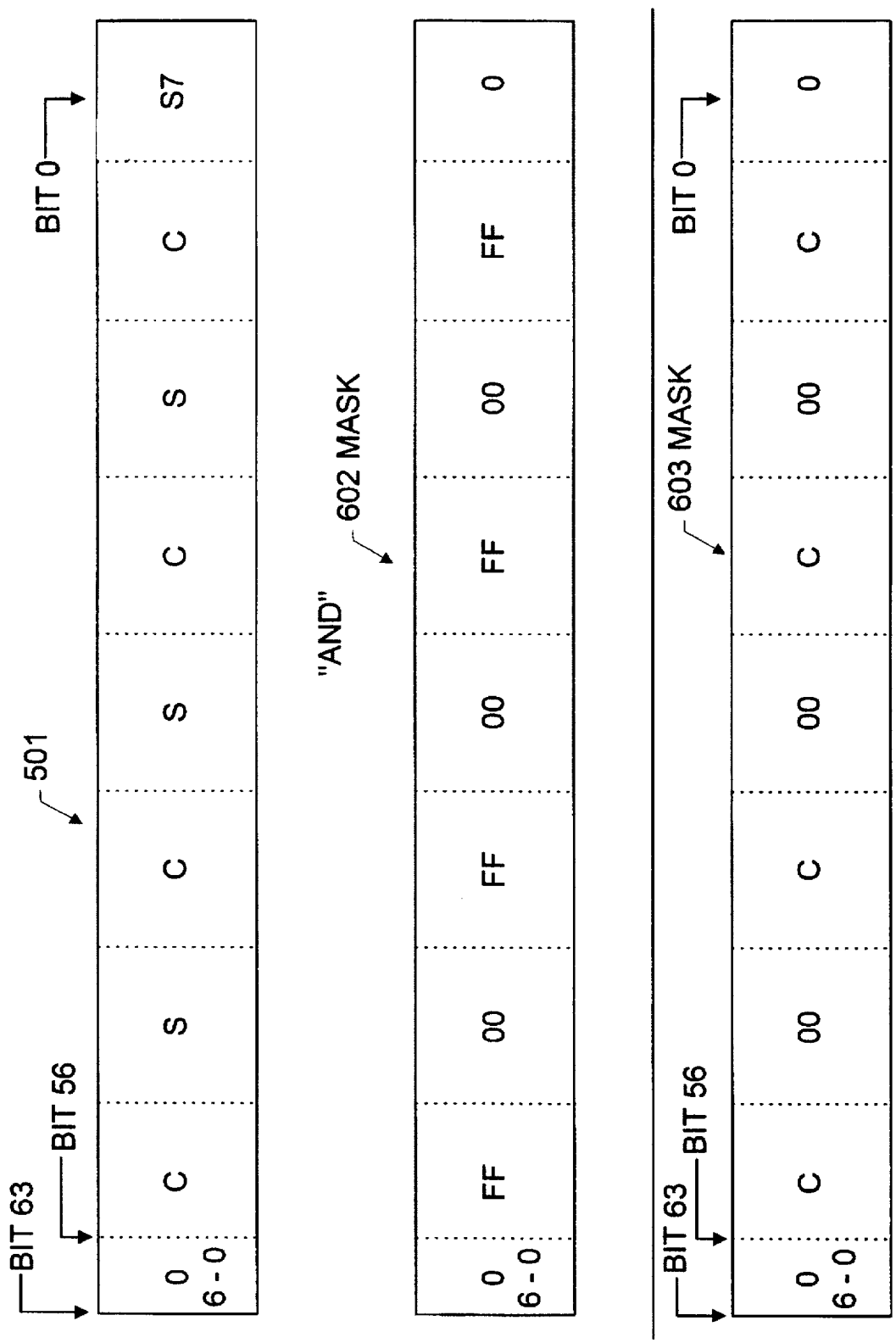
FIG. 6 illustrates step 3 of the reduction method.

FIG. 6 illustrates step 3 in the reduction process. The contents of register 501 are "anded" with a mask stored in register 602 to strip off the sum information. The mask has "1"s in bit positions where information from register 501 is to be preserved and zeros in all other bit positions. Resister 603 holds the result of the "and" instruction and all information except the carry information is replaced by zeros.

Figure 7:
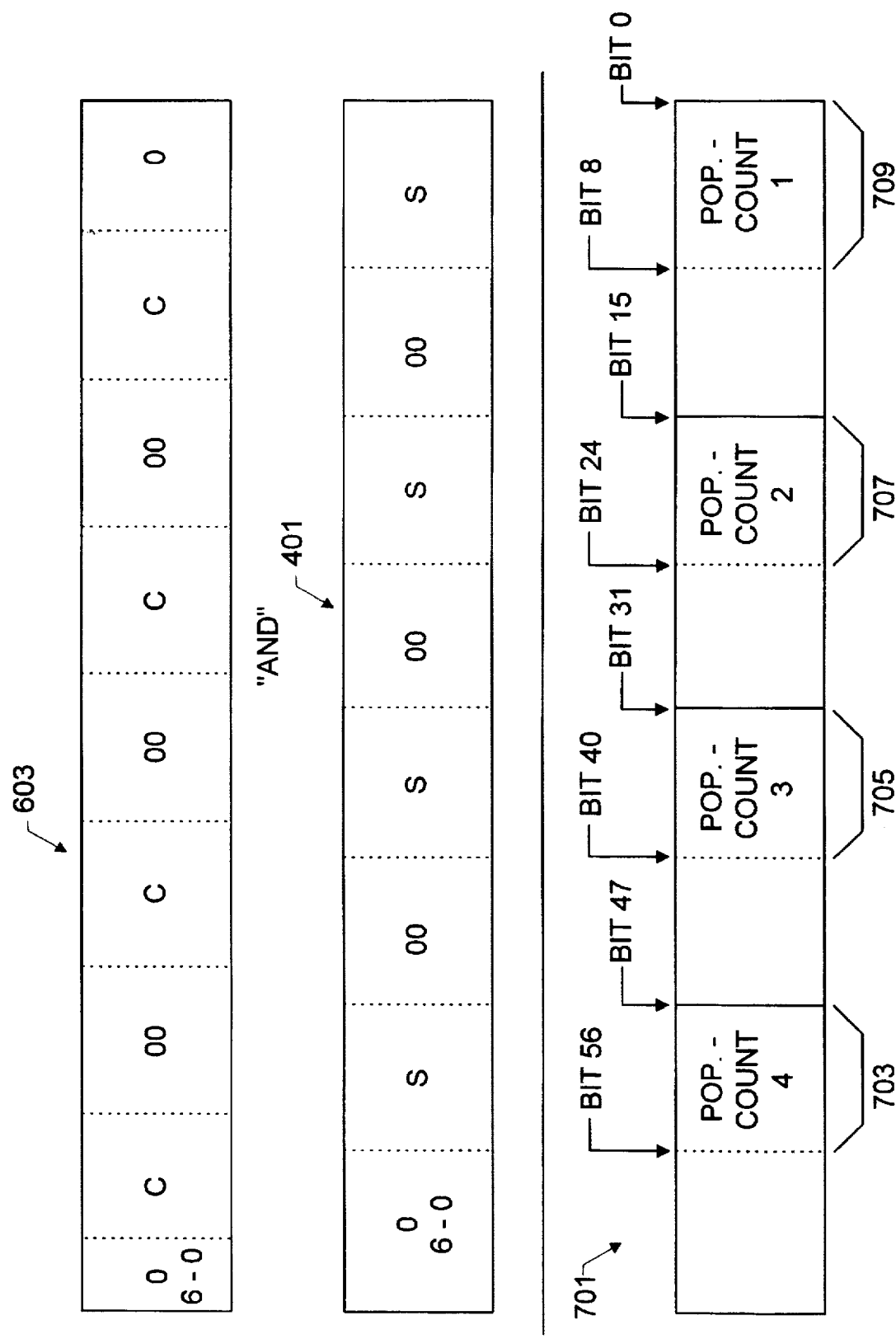
FIG. 7 illustrates step 4 of the reduction method.

FIG. 7 illustrates step 4 in the reduction process. The contents of the register 603 is "added" to the contents of register 401 and the result is four partial population counts 703–709 each 9 bits in length and in normal binary format. These partial counts 703–709 are then stored and accumulated as required during the population count of a long string of bits. Eventually the 16-bit blocks the partial population counts are stored in can overflow and a further reduction will have to be performed. For the embodiment described above the number of iterations that can occur before an overflow is possible is 215. This number is derived as follows:

$$N=2^{2m}/(\text{largest reduction result})=2^{2m}/2^n[2^{(m-n)}+m-n-1]$$

with the result rounded down to the nearest integer. Therefore in the above example, $N=2^{2*8}/304=215$ At some point a full reduction must be performed to reduce the partial population counts to a single binary number result. This final reduction is performed by shifting and masking as is known by those skilled in the art. Of course, The various reductions represent overhead in the population count process. However as the reductions are delayed until necessary, the overhead is amortized over a large number of iterations effectively reducing the overhead required for population counts of large bit strings. For bit strings larger than 640 bits, this new and novel apparatus and method is faster than the prior art apparatus and method for a given technology and design rules.

The preferred embodiment described above assumes that a fully reduced population count and accumulate cannot be performed within a single CPU cycle which is typically the case. As each CPU design has different limitations, the most efficient population count implementation may be different for each CPU design and may be different from the described embodiment. However for a given CPU design, the most efficient population count and accumulate design will maximize the population count reduction while still allowing sufficient time for the accumulate function to occur within a single CPU cycle. So while the described embodiment computed four population counts, the outputs of the adders 333–339, if the CPU cycle time and the particular technology permitted, reducing the four outputs to two outputs before the accumulate function was performed would be more efficient. This is because the population count instruction could be performed many more times before a overflow of one or more of the partial counts could occur.

Figure 8:
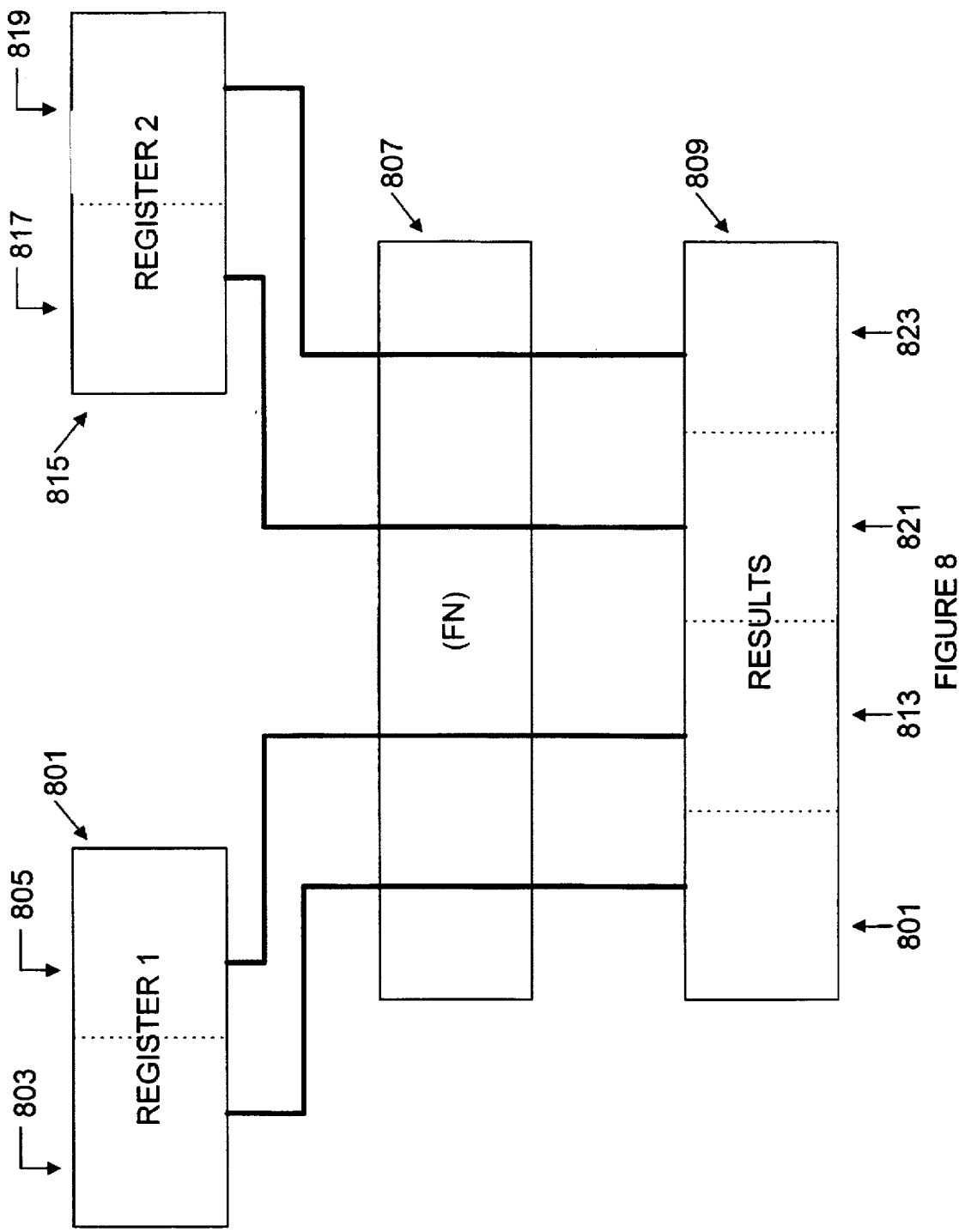
FIG. 8 illustrates a second preferred embodiment of the present invention.

A second preferred embodiment of the present invention is illustrated in FIG. 8. In this illustration, four population counts are computed for an operand stored in two registers. The part of the operand stored in the first register 801, is divided into two parts 803 and 805. Separate population counts are computed for both parts (803 and 805), by a population count circuit 807, with the results being stored in a storage location 809 which is typically a register. The results are stored in separate locations, 811 and 813 respectively, within the storage location 809. The function (Fn) that the population count circuit 807 performs is counting of the number of is in the operands. Of course instead of counting 1s the circuit could count 0s.

In like manner the part of the operand stored in the second register 815 is divided into two parts 817 and 819. Population counts are computed for both parts by circuitry 807 and the results are stored in separate locations, 821 and 823 respectively within storage location 809.

The four population counts 811, 813, 821 and 823 will have to be accumulated with the four population counts computed with each new iteration. However, this process of computing population counts has the advantage of using an operand of 128 bits in length which reduces the number iterations required to compute a population count over a large string from what is required by the prior art.

Figure 9:
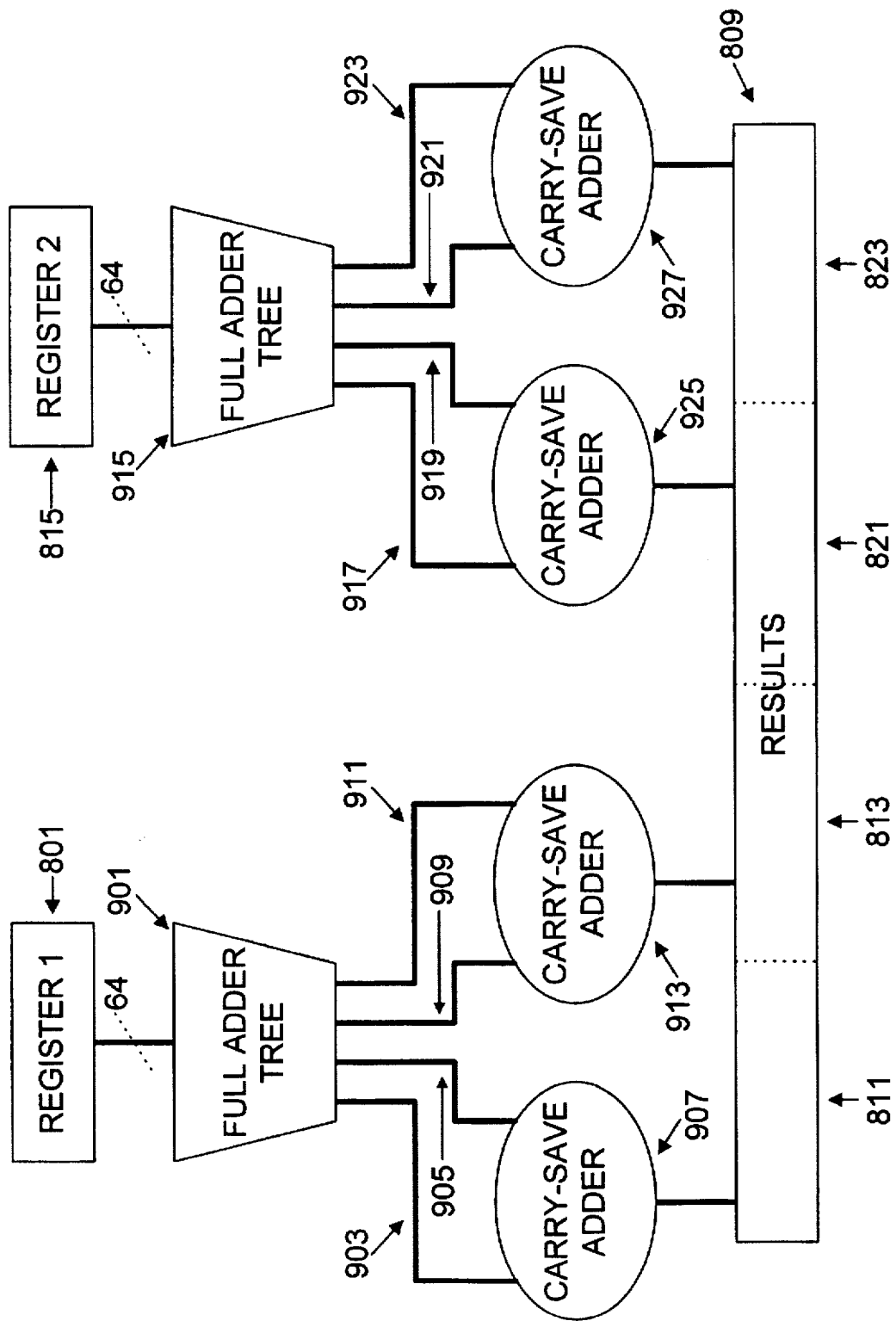
FIG. 9 is a detailed block diagram of the embodiment illustrated in FIG. 8.

FIG. 9 is a more detailed illustration of the invention described in association with FIG. 8. The 64 bits of the operand stored the first register 801 are inputs to a full adder tree 901. This adder tree is identical to the full adders, 303–339, described in association with FIG. 3. The adders produce four population counts, each 5 bits in size, for the 64 bits as previously described. Two of the 5-bit population counts, 903 and 905, are inputs to a carry-save adder 907 and the output of the carry-save adder 907 is stored in section 811 within storage location 809. The other two 5-bit population counts, 909 and 911, from adder tree 901 are inputs to a second carry-save adder 913 and the output of the carry-save adder 913 is stored in section 813 within storage location 809.

In like manner the 64 bits from the second register 815 are added by the adder tree 915 which produces four 5-bit population counts 917, 919, 921 and 923. The four population counts are inputs to two carry-save adders 925 and 927 with the outputs from the carry-save adders being stored in sections 821 and 823 respectively within storage location 809. The end result of this process is four population counts stored in carry-save format in storage location 809.

The four carry-save adders 907, 913, 925 and 927 are used to save time over what would be needed if four full adders were used. Also while the adder trees are illustrated producing four 5-bit population counts, a particular CPU design limitations may dictate a modification of this process. For example if additional time permits, then an additional full adder stage could be added to the adder trees such that the adder trees would produce two population counts. In which case only two carry-save adders would be needed. Conversely, if there was insufficient time for a four level adder tree, then a three level adder tree would be implemented with each tree producing eight population counts. In this case, eight carry-save adders would be needed and storage location 809 would hold eight population counts in carry-save format.

While the prior art treated a population count as an atomic instruction, that is, the output of the instruction was a typical binary number which was position weighted with each adjacent bit representing a value $2^n$ larger or smaller than the neighboring bit, the present invention breaks the instruction into parts. The output of a population count instruction, according to the present invention, is multiple population counts where a bit in the result does not necessarily represent a value $2^n$ larger or smaller than its neighboring bit. This unique and novel method and apparatus allows the population count of a large string of bits to be computed faster than would be possible using the prior art methods and apparatus.

Other embodiments of the invention will be apparent to those skilled in the art from a consideration of this specification or practice of the invention disclosed herein. It is intended that the specification and examples be considered as exemplary only, with the scope of the invention being defined by the following claims.

I claim:

1. An apparatus for computing a population count comprising:

an operand storage register storing a string of bits for which a population count is to be determined;

a plurality of full adders, each having an output, and each full adder adds a unique group of bits from the operand storage register;

a plurality of carry-save adders, each having an output, and each carry-save adder adds a unique group of bits from an accumulation register to a unique one of the plurality of the full adder outputs; and each of the carry-save adder outputs is stored in a unique number of bits in a result register;

whereby the result register contains the sum of a population count, of a subset of bits from the operand storage register, and a group of bits from the accumulation register in carry-save format.

2. An apparatus as in claim 1 wherein:

the plurality of full adders are organized in a hierarchical order such that a first level of full adders add bits from the operand storage register and a second level of full adders connected to the first level of full adders such that each of the full adders in the second level add the outputs from two of the first level of full adders such that each output from the first level of full adders is added by only one of the adders in the second level of full adders.

3. An apparatus as in claim 2 wherein:

the number of full adders in the first level is one-half of the number of bits in the operand storage register and the number of full adders in the second level of full adders is one-fourth the number of bits in the operand storage register.

4. An apparatus as in claim 1 wherein:

each carry-save adder adds an equal number of bits as every other carry-save adder.

5. An apparatus as in claim 1 wherein:

a single register is both the accumulation register and the result register.

6. An apparatus for computing a population count, of a first string of bits stored in a first storage location, and accumulating the computed population count with a second string of bits stored in a second storage location, comprising:

an adder adding together bits from the first string of bits stored in the first storage location such that a first result representing the number of like bits, 1s or 0s, is generated;

a carry-save adder adding together the first result and the second string of bits stored in the second storage location such that a second result, in carry-save format, representing the sum of the first result and the second string of bits is generated;

a second result storage location in which the second result is stored; and a single storage location is both the second storage location and the second result storage location.

7. An apparatus for computing a population count, of a first string of bits, and accumulating the computed population count with a second string of bits, comprising:

an operand storage register storing a string of bits for which a population count is to be generated;

a first level of full adders each adding two bits from the first string of bits together such that each bit from the first string of bits is added by only one adder in the first level of full adders and each adder generates an output;

a second level of full adders each adding two outputs from the first level of full adders such that each output from the first level of full adders is added by only one adder in the second level of full adders and each adder in the second level of adders generates an output;

a third level of full adders each adding two outputs from the second level of full adders such that each output from the second level of full adders is added by only one adder in the third level of full adders and each adder in the third level of adders generates an output;

a fourth level of full adders each adding two outputs from the third level of full adders such that each output from the third level of full adders is added by only one adder in the fourth level of full adders and each adder in the fourth level of adders generates an output;

a level of carry-save adders each adding an output from a fourth level of full adders, such that each output from the fourth level of full adders is added by only one carry-save adder, to one fourth of the bits in a second string of bits, such that each one-fourth of the bits in the second string of bits is added by only one carry-save adder, and each carry-save adder generates a sum in carry-save format; and each of the sums is stored in a storage location in carry save format.

8. An apparatus as in claim 7 wherein:

the second string of bits is stored in the same location as the sums.

* * * * *